United States Patent
Shin et al.

(10) Patent No.: US 9,646,772 B2
(45) Date of Patent: *May 9, 2017

(54) HIGH VOLTAGE ELECTRODE FOR ELECTRIC DUAL LAYER CAPACITOR AND METHOD OF MANUFACTURING THE SAME

(71) Applicant: KOREA JCC CO., LTD., Cheongwon-gun (KR)

(72) Inventors: Dal Woo Shin, Cheongju-si (KR); Mun Soo Lee, Cheongju-si (KR); Jin Sik Shin, Cheongju-si (KR)

(73) Assignee: KOREA JCC CO., LTD., Cheongwon-Gun (KR)

( * ) Notice: Subject to any disclaimer, the term of this patent is extended or adjusted under 35 U.S.C. 154(b) by 138 days.

This patent is subject to a terminal disclaimer.

(21) Appl. No.: 14/645,784

(22) Filed: Mar. 12, 2015

(65) Prior Publication Data

US 2015/0332865 A1    Nov. 19, 2015

(30) Foreign Application Priority Data

May 14, 2014 (KR) .......................... 10-2014-0057835
Feb. 6, 2015 (KR) .......................... 10-2015-0018627

(51) Int. Cl.
*H01G 11/24* (2013.01)
*H01G 11/28* (2013.01)
*H01G 11/32* (2013.01)
*H01G 11/86* (2013.01)

(52) U.S. Cl.
CPC .............. *H01G 11/24* (2013.01); *H01G 11/28* (2013.01); *H01G 11/32* (2013.01); *H01G 11/86* (2013.01); *Y02E 60/13* (2013.01)

(58) Field of Classification Search
CPC ........ H01G 11/30; H01G 11/28; H01G 11/32; H01G 11/04; H01G 11/42
See application file for complete search history.

(56) References Cited

U.S. PATENT DOCUMENTS 8,085,525 B2 * 12/2011 Sakata .................. H01G 9/016
                                                                361/502
8,871,358 B2    10/2014 Jiang et al.
2004/0206744 A1* 10/2004 Groll ...................... A47J 27/002
                                                                219/400

(Continued)

FOREIGN PATENT DOCUMENTS

KR          101166148          7/2012

*Primary Examiner* — Nguyen Ha
(74) *Attorney, Agent, or Firm* — Cantor Colburn LLP

(57) ABSTRACT

A high voltage electrode includes a through type aluminum sheet, a plurality of first hollow protrusion members protruded to one side of the through type aluminum sheet, a plurality of second hollow protrusion members protruded to the other side of the through type aluminum sheet, a metal oxidation layer coated on the through type aluminum sheet, the plurality of first hollow protrusion members, and the plurality of second hollow protrusion members, a first active material sheet bonded to the metal oxidation layer so that it is placed in the first surface of the through type aluminum sheet, and a second active material sheet bonded to the metal oxidation layer so that it is placed in the second surface of the through type aluminum sheet.

16 Claims, 6 Drawing Sheets

(56) References Cited

U.S. PATENT DOCUMENTS

2010/0020471 A1* 1/2010 Schneuwly ............ H01G 9/016
                                                        361/502
2015/0332862 A1* 11/2015 Shin ....................... H01G 11/68
                                                        361/502

* cited by examiner

| Carbide: Mixed alkali | NaOH:KOH | Specific surface area (m²/g) | Impurities (ppm) |
|---|---|---|---|
| 1:2.0 | 1:9 | 1640 | 320.5 |
| 1:2.3 | | 1720 | 331.1 |
| 1:2.6 | | 1900 | 340.8 |
| 1:3.0 | | 2050 | 427.4 |

HIGH VOLTAGE ELECTRODE FOR ELECTRIC DUAL LAYER CAPACITOR AND METHOD OF MANUFACTURING THE SAME

CROSS-REFERENCE TO RELATED APPLICATION

This application claims the benefit of Korean Patent Application No. 10-2014-0057835, filed on May 14, 2014 and Korean Patent Application No. 10-2015-0018627, filed on Feb. 6, 2015 in the Korean Intellectual Property Office, the disclosure of which is incorporated herein by reference.

BACKGROUND OF THE INVENTION

1. Field of the Invention

The present invention relates to a high voltage electrode for an electric double layer capacitor and a method of manufacturing the same and, more particularly, to a high voltage electrode for an electric double layer capacitor and a method of manufacturing the same, which are capable of implementing a high voltage electrode by preventing a loss of the surface area of an aluminum sheet that is used in an electrode for an electric double layer capacitor so that a contact area between the aluminum sheet and an active material sheet is increased when forming a plurality of through holes in the aluminum sheet and by forming a metal oxidation layer on the entire surface of the aluminum sheet.

2. Description of the Related Art

An electric double layer capacitor (EDLC) has a less influence on the lifespan although it is repeatedly charged and discharged because it stores electric energy using a physical adsorption phenomenon with reversibility and is being applied to smart phones, hybrid vehicles, electric vehicles, and the energy storage device field applied to solar cell generation. The electric double layer capacitor has an excellent power density, but has a low energy density. Accordingly, there is a need to develop materials for electrodes in order to improve the low energy density problem.

Korean Patent No. 1166148 (Patent Document 1) relates to a method of manufacturing an aluminum current collector having a three-dimensional pattern structure using photolithography. In the method of manufacturing the aluminum current collector disclosed in Patent Document 1, first, after an aluminum foil current collector is washed, it is dried using nitrogen atmosphere. Thereafter, a photoresist solution is coated on a surface of the dried aluminum foil current collector and then dried and cured so that the photoresist solution is selectively exposed.

Thereafter, the photoresist solution that has not been exposed is selectively removed by scattering a developer on the aluminum current collector that has been exposed so that the remaining photoresist solution is fully cured, thereby forming a pattern on the aluminum current collector. The aluminum foil current collector in which the pattern has been formed is placed between two carbon plates, that is, opposite electrodes, AC power is applied to the aluminum foil current collector, and primary etching is performed on the aluminum current collector in an electrolyte.

Thereafter, the etched aluminum current collector is dried. Next, the aluminum current collector dried after the primary etching is placed between the two carbon plates, that is, opposite electrodes, and secondary etching is performed on the aluminum current collector. Thereafter, the aluminum foil subjected to the secondary etching is washed and dried.

As in Patent Document 1, the energy density of a conventional electrode for an electric double layer capacitor is improved by forming a pattern, that is, a plurality of through holes, in an aluminum current collector using a photolithography process so that a contact area between the aluminum current collector and active materials is increased.

If a plurality of through holes is formed in an aluminum current collector that is used in a conventional electrode for an electric double layer capacitor as in Patent Document 1, however, there is a problem in that the surface area of the aluminum current collector is lost by an area that belongs to a total area of the aluminum current collector and that is occupied by the through holes.

SUMMARY OF THE INVENTION

Accordingly, the present invention has been made keeping in mind the above problems occurring in the prior art, and an object of the present invention is to provide a high voltage electrode for an electric double layer capacitor and a method of manufacturing the same, which are capable of implementing a high voltage electrode by preventing a loss of the surface area of an aluminum sheet that is used in an electrode for an electric double layer capacitor so that a contact area between the aluminum sheet and an active material sheet is increased when forming a plurality of through holes in the aluminum sheet and by forming a metal oxidation layer on the entire surface of the aluminum sheet.

In an embodiment, a high voltage electrode for an electric double layer capacitor may include a through type aluminum sheet configured to have a plurality of through holes formed in the through type aluminum sheet so that the through holes are spaced apart from one another; a plurality of first hollow protrusion members extended from the through type aluminum sheet in such a way as to communicate with the through holes and protruded to one side of the through type aluminum sheet; a plurality of second hollow protrusion members spaced apart from the plurality of first hollow protrusion members, extended from the through type aluminum sheet in such a way as to communicate with the through holes, and protruded to the other side of the through type aluminum sheet; a metal oxidation layer coated on the through type aluminum sheet, the plurality of first hollow protrusion members, and the plurality of second hollow protrusion members; a first active material sheet placed on the first surface of the through type aluminum sheet and bonded to the metal oxidation layer so that the plurality of first hollow protrusion members is buried; and a second active material sheet configured to have the plurality of second hollow protrusion members buried in the second active material sheet and placed on the second surface of the through type aluminum sheet and bonded to the metal oxidation layer so that the second active material sheet is connected to the first active material sheet through the plurality of first hollow protrusion members and the plurality of second hollow protrusion members.

In an embodiment, a method of manufacturing a high voltage electrode for an electric double layer capacitor may include preparing a through type aluminum sheet configured to have a plurality of first hollow protrusion members and a plurality of second hollow protrusion members respectively formed in the first surface and second surface of the through type aluminum sheet and to have a metal oxidization layer formed on the entire surface of the through type aluminum sheet by winding the through type aluminum sheet on a first roller; preparing a first active material sheet by winding the first active material sheet on a second roller; preparing a second active material sheet by winding the second active material sheet on a third roller; placing the first active material sheet on the first surface of the through type aluminum sheet and the second active material sheet on the second surface of the through type aluminum sheet and transferring the through type aluminum sheet and the first active material sheet and the second active material sheet to a press unit; and placing the first active material sheet and the second active material sheet in the first surface and second surface of the through type aluminum sheet, respectively, bonding the first active material sheet and the second active material sheet to the metal oxidation layer, and simultaneously pressurizing the first active material sheet and the second active material sheet using the press unit so that the first active material sheet and the second active material sheet are connected through the plurality of first hollow protrusion members and the plurality of second hollow protrusion members.

BRIEF DESCRIPTION OF THE DRAWINGS

The above and/or other aspects of the present invention will become apparent and more readily appreciated from the following description of the exemplary embodiments, taken in conjunction with the accompanying drawings in which.

DETAILED DESCRIPTION OF THE INVENTION

Figure 1:
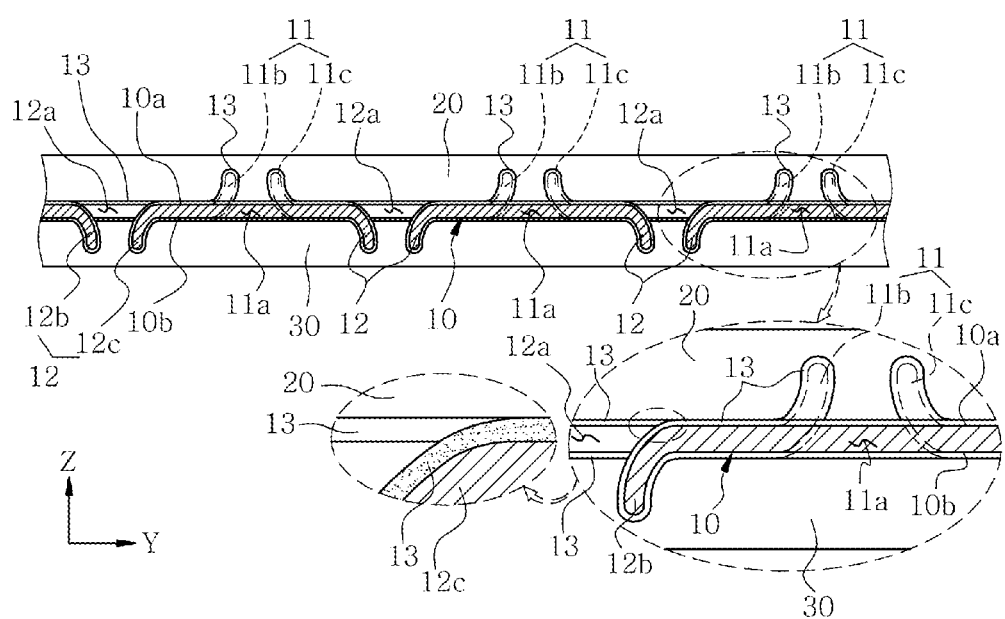
FIG. 1 is a cross-sectional view of a high voltage electrode which may be applied to an electric double layer capacitor in accordance with an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Hereinafter, a high voltage electrode for an electric double layer capacitor and a method of manufacturing the same according to some embodiments of the present invention are described.

Figure 2:
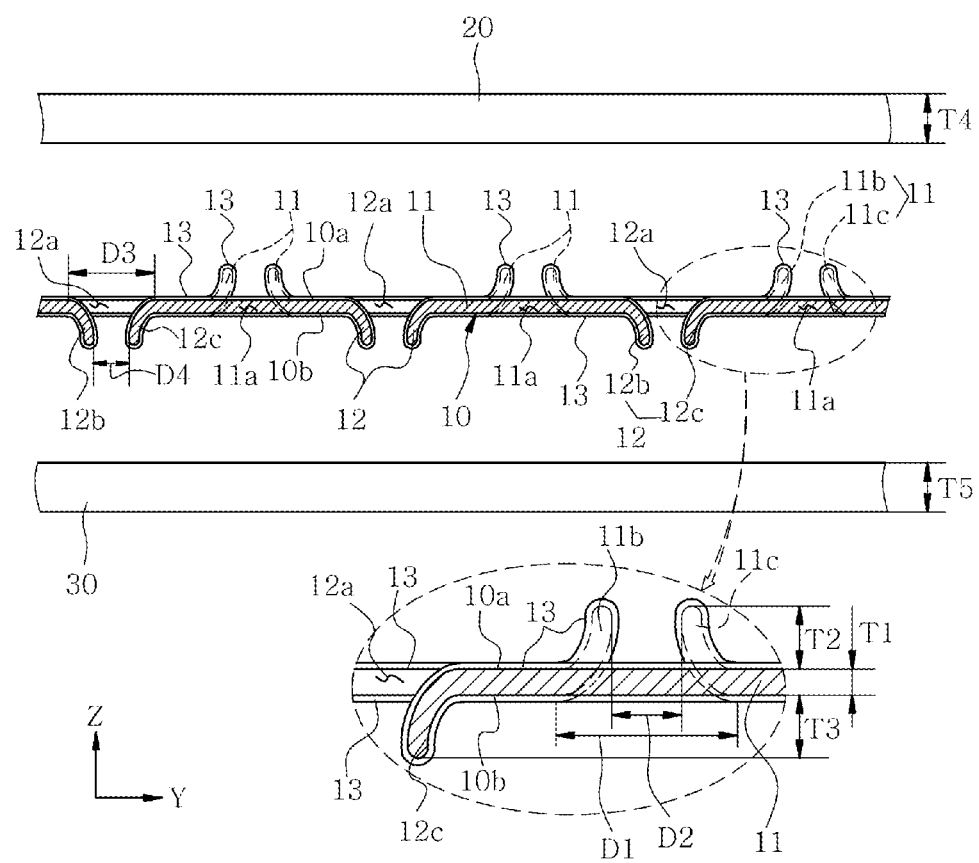
FIG. 2 is a cross-sectional view illustrating a state before an active material sheet is bonded to a through type aluminum sheet of FIG. 1.

As illustrated in FIGS. 1 and 2, the high voltage electrode for an electric double layer capacitor in accordance with an embodiment of the present invention may include a through type aluminum sheet 10, a first active material sheet 20, and a second active material sheet 30.

The through type aluminum sheet 10 has a plurality of through holes 11a and 12a spaced apart from one another and formed therein and includes a plurality of first hollow protrusion members 11, a plurality of second hollow protrusion members 12, and a metal oxidation layer 13. The plurality of first hollow protrusion members 11 is extended from the through type aluminum sheet 10 in such a way as to respectively communicate with the plurality of through holes 11a and is protruded to one side of the through type aluminum sheet 10. The plurality of second hollow protrusion members 12 is spaced apart from the plurality of first hollow protrusion members 11. Furthermore, the plurality of second hollow protrusion members 12 is extended from the through type aluminum sheet 10 in such a way as to respectively communicate with the through holes 12a and is protruded to the other side of the through type aluminum sheet 10. The metal oxidation layer 13 is coated on the through type aluminum sheet 10, the plurality of first hollow protrusion members 11, and the plurality of second hollow protrusion members 12. The first active material sheet 20 is placed on the first surface 10a of the through type aluminum sheet 10 and bonded to the metal oxidation layer 13 so that the plurality of first hollow protrusion members 11 is buried in the first active material sheet 20. The second active material sheet 30 is placed on the second surface 10b of the through type aluminum sheet 10 and bonded to the metal oxidation layer 13 so that the plurality of second hollow protrusion members 12 is buried in the second active material sheet 30 and the second active material sheet 30 is connected to the first active material sheet 20 through the plurality of first hollow protrusion members 11 and the plurality of second hollow protrusion members 12.

The configuration of the high voltage electrode for an electric double layer capacitor in accordance with an embodiment of the present invention is described in more detail below.

Figure 3:
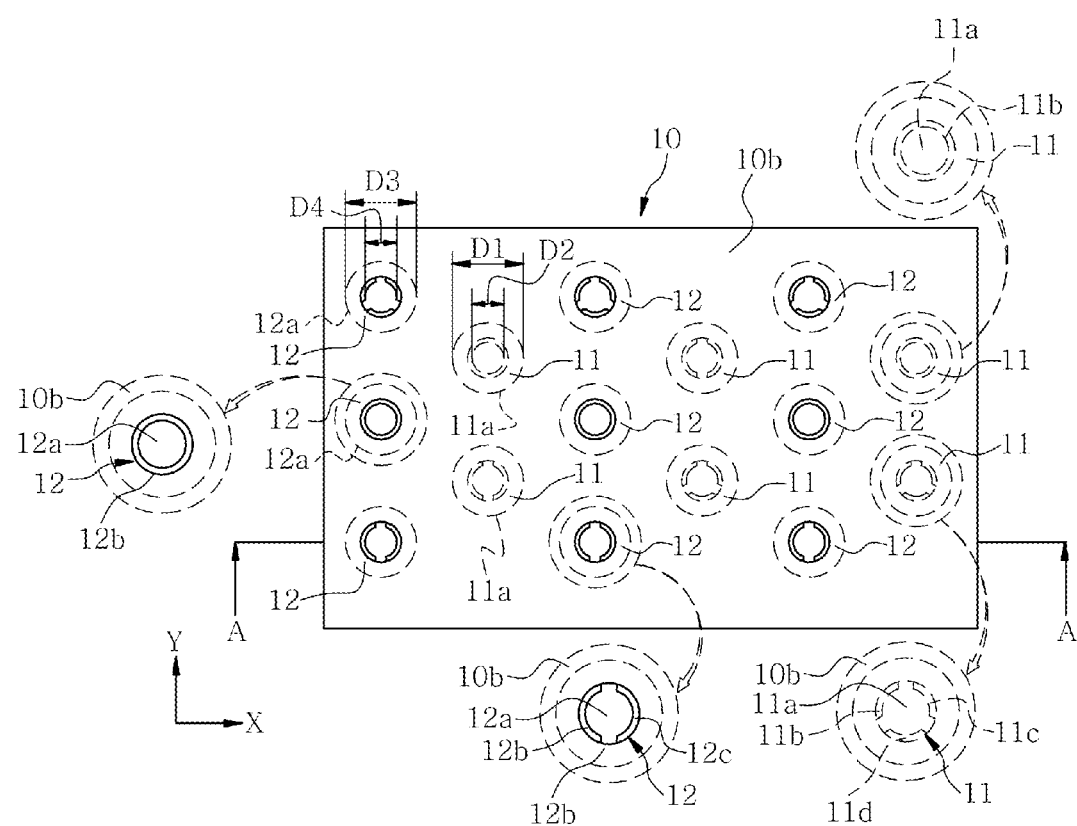
FIG. 3 is a rear view of the through type aluminum sheet of FIG. 2 which is seen from the other side.

As illustrated in FIGS. 1 to 3, the through type aluminum sheet 10 includes the plurality of through holes 11a and 12a spaced apart from one another. The first surface 10a and second surface 10b of the through type aluminum sheet 10 are formed to be penetrated. Each of the diameters D1 and D3 of the respective holes 11a and 12a may be 50 to 0 µm. The through type aluminum sheet 10 in which the plurality of through holes 11a and 12a is formed may have a thickness T1 of 10 to 50 µm. The through type aluminum sheet 10 improves a specific resistance characteristic using purity of 99.20 to 99.99%, thereby improving the electrical properties of the high voltage electrode applied to an electric double layer capacitor in accordance with an embodiment of the present invention. In this case, FIG. 1 is an enlarged sectional view of a portion "Aa" illustrated in FIG. 7 and the through type aluminum sheet 10 of FIG. 2 is a cross-sectional view of line "A-A" illustrated in FIG. 3.

Figure 4:
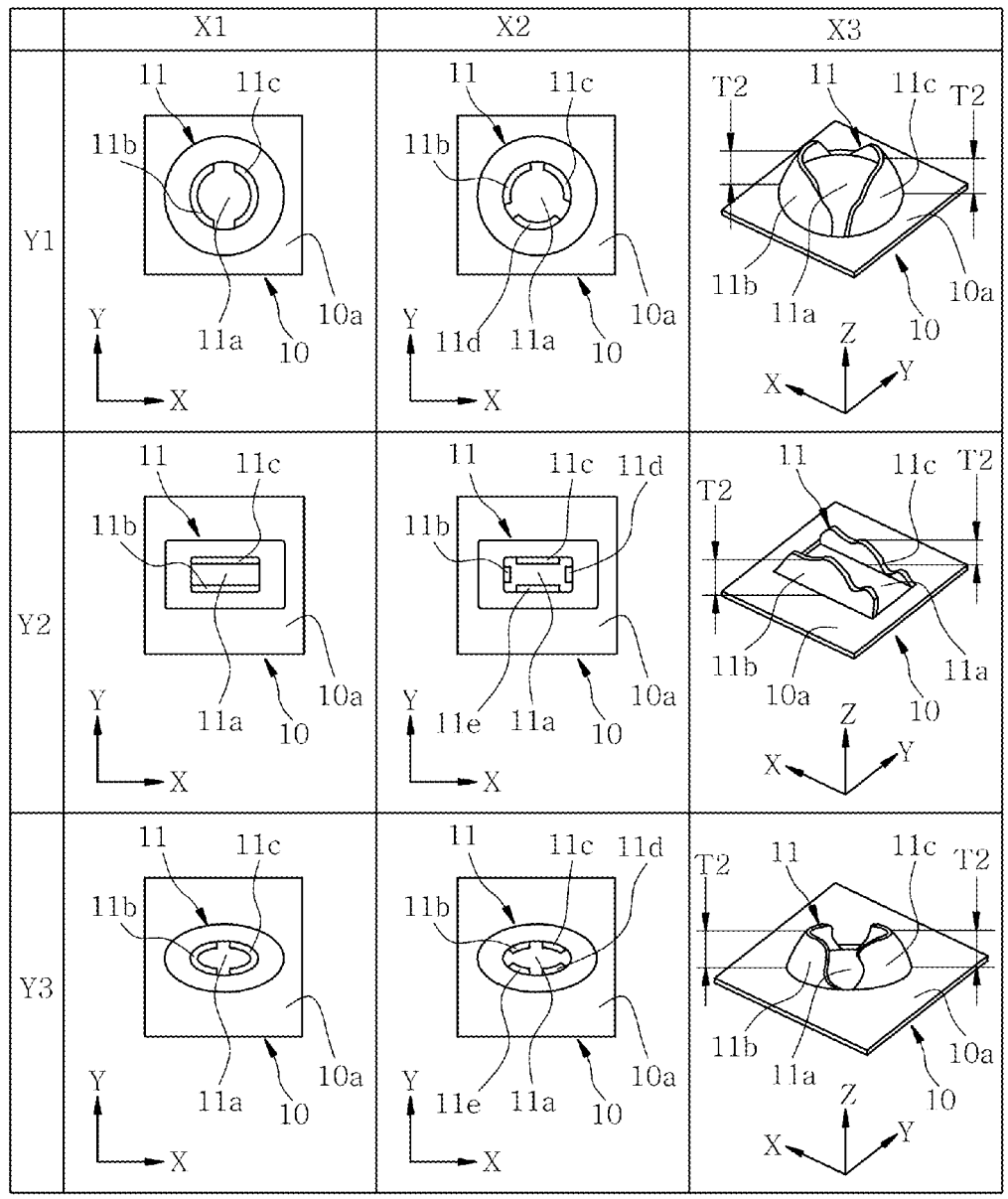
FIG. 4 is a table illustrating various embodiments of first hollow protrusion members illustrated in FIG. 2.

As illustrated in FIGS. 2 and 3, the plurality of through holes 11a and 12a is formed in the through type aluminum sheet 10 by perforating the through type aluminum sheet 10 using one of a cylindrical pillar member (not illustrated), an elliptical pillar member (not illustrated), and a square pillar member (not illustrated) each having a pointed tip, such as a needle or a drill, by applying pressure on the part of the first surface 10a or the second surface 10b. The plurality of first hollow protrusion members 11 and the plurality of second hollow protrusion members 12 are extended from the through type aluminum sheet 10 and protruded so that they respectively communicate with the plurality of through holes 11a and 12a. As illustrated in FIG. 4, each of the plurality of through holes 11a and 12a may have one of a cylindrical shape, an oval, and a square shape and may be formed as one of the cylindrical pillar member, the elliptical pillar member, and the square pillar member. FIG. 4 is a table illustrating various embodiments of the first hollow protrusion member 11. The second hollow protrusion member 12 is applied like the first hollow protrusion members 11 of FIG. 4, and thus a description and drawings of various embodiments of the second hollow protrusion members 12 are omitted.

For example, the plurality of first hollow protrusion members 11 may include the plurality of through holes 11a formed in the through type aluminum sheet 10 by perforating one of the cylindrical pillar member, the elliptical pillar member, and the square pillar member having a point end in the direction toward the first surface 10a of the through type aluminum sheet 10 by applying pressure. The plurality of first hollow protrusion members 11 is extended from the through holes 11a by the softness of the through type aluminum sheet 10 and protruded to one side of the through type aluminum sheet 10. In this case, the through hole 11a may have one of a cylindrical shape, an oval, and a square shape because it is formed of one of the cylindrical pillar member, the elliptical pillar member, and the square pillar member, as illustrated in FIG. 4.

Each of the plurality of through holes 11a may have one of a cylindrical shape, an oval, and a square shape because it is formed of the cylindrical pillar member, the elliptical pillar member, and the square pillar member, as illustrated in FIG. 4. For example, if the cylindrical pillar member is used, each of the plurality of through holes 11a may have a cylindrical shape as in a column Y1. If the elliptical pillar member is used, each of the plurality of through holes 11a may have an oval as in a column Y3. If the square pillar member is used, each of the plurality of through holes 11a may have a square shape as in a column Y2. The first hollow protrusion members 11 illustrated in a row X3 are perspective views of the first hollow protrusion members 11 illustrated in a row X2.

The plurality of through holes 12a of the plurality of second hollow protrusion members 12 is formed in the through type aluminum sheet 10 by perforating the through type aluminum sheet 10 in the direction toward the second surface 10b of the through type aluminum sheet 10 by applying pressure using one of the cylindrical pillar member, the elliptical pillar member, and the square pillar member each having a pointed tip. The plurality of second hollow protrusion members 12 is extended from the through holes 11a by the softness of the through type aluminum sheet 10 and protruded to the other side of the through type aluminum sheet 10. In this case, like the plurality of through holes 11a of FIG. 4, each of the plurality of through holes 12a has one of a cylindrical shape, an oval, and a square shape because it is formed of one of the cylindrical pillar member, the elliptical pillar member, and the square pillar member, as illustrated in FIG. 4.

The plurality of first hollow protrusion members 11 and the plurality of second hollow protrusion members 12 include one or more extruded burr members 11b, 11c, and 11d and 12b, 12c, and 12d because they are made of one of the cylindrical pillar member, the elliptical pillar member, and the square pillar member each having a pointed tip. For example, as illustrated in FIG. 3, the first hollow protrusion member 11 and the second hollow protrusion member 12 may include respective extruded burr members 11b and 12b or may have two or more extruded burr members 11b, 11c, and 11d and 12b, 12c, and 12d. That is, a single through type aluminum sheet 10 may include the first hollow protrusion member 11 and the second hollow protrusion member 12 that include respective extruded burr members 11b and 12b or include the two or more extruded burr members 11b, 11c, and 11d and 12b, 12c, and 12d, respectively. As in the first hollow protrusion members 11 of FIG. 4, the first hollow protrusion member 11 may include four extruded burr members 11b, 11c, 11d, and 11e if the through hole 11a is formed to have a square shape or an oval as in the column Y3 or the column Y3. The same principle applied to the first hollow protrusion members 11 may be applied to the second hollow protrusion members 12. In the table of FIG. 4, the row X1 illustrates an embodiment in which two extruded burr members 11b and 11c have been formed in the first hollow protrusion member 11. The row X2 illustrates an embodiment in which three or four extruded burr members 11b, 11c, 11d, and 11e have been formed in the first hollow protrusion member 11. The row X3 is a perspective view of the first hollow protrusion member 11 illustrated in the row X1. Furthermore, FIG. 1 is a cross-sectional view of a high voltage electrode for an electric double layer capacitor formed the first hollow protrusion members 11 and the second hollow protrusion members 12 in which the two extruded burr members 11b, 11c, and 12b, 12c illustrated in the row X1 and column Y1 of FIG. 4 have been formed.

The one or more extruded burr members 11b, 11c, and 11d and 12b, 12c, and 12d are extended from the through holes 11a and 12a and are integrally formed in the through type aluminum sheet 10 so that they are spaced apart from one another. The one or more extruded burr members 11b, 11c, and 11d and 12b, 12c, and 12d have respective heights T2 and T3 of 2 to 70 μm. For example, as illustrated in FIGS. 2 and 4, the heights T2 and T3 of the extruded burr members 11b and 12b are the highest heights from the first surface 10a of the through type aluminum sheet 10 or the second surface 10b. The plurality of extruded burr members 11b, 11c, and 11d and 12b, 12c, and 12d has been illustrated as having a height of 2 μm or more from the first surface 10a of the through type aluminum sheet 10 or the second surface 10b in the state in which they have been separated. Since the plurality of first hollow protrusion members 11 and the plurality of second hollow protrusion members 12 are formed to have the one or more extruded burr members 11b, 11c, and 11d and 12b, 12c, and 12d as described above, thereby further increasing the surface area of the through type aluminum sheet 10. For example, if the first hollow protrusion member 11 and the second hollow protrusion member 12 are formed of cylindrical pillar members, the cylindrical through holes 11a and 12a having uniform diameters D1 and D3 may be formed in the first hollow protrusion member 11 and the second hollow protrusion member 12, or the extruded burr members 11b and 12b may be formed so that one side or the other side of the first hollow protrusion member 11 and the second hollow protrusion member 12 has an inside diameter D2, D4 equal to or smaller than the diameter D1, D3. Accordingly, the surface area of the through type aluminum sheet 10 can be further increased.

The metal oxidation layer 13 is coated on surfaces of the through type aluminum sheet 10, the plurality of first hollow protrusion members 11, and the plurality of second hollow protrusion members 12 and configured to surround the through type aluminum sheet 10. That is, the metal oxidation layer 13 is configured to include a surface of the through type aluminum sheet 10, the outer circumference surface and inner circumference surface of the plurality of first hollow protrusion members 11, and the outer circumference surface and inner circumference surface of the plurality of second hollow protrusion members 12. Accordingly, an electric double layer capacitor to which an electrode in accordance with an embodiment of the present invention has been applied can implement a high voltage. In this case, $Al_2O_3$ may be used as materials for the metal oxidation layer 13. The metal oxidation layer 13 is formed on the entire surface of the through type aluminum sheet 10, including the plurality of first hollow protrusion members 11 and the plurality of second hollow protrusion members 12, using an anodization method.

As illustrated in FIGS. 1 and 2, the first active material sheet 20 and the second active material sheet 30 are simultaneously pressurized to the first surface 10a and second surface 10b of the through type aluminum sheet 10 and bonded to the metal oxidation layer 13 by repeating a roll press method twice or more so that they are connected through the plurality of first hollow protrusion members 11 and the plurality of second hollow protrusion members 12. If the roll press method is repeatedly performed twice or more, the thicknesses T4 and T5 of the first active material sheet 20 and the second active material sheet 30 pressurized by the roll press method that is finally performed are 2 to 30% smaller than the thicknesses T6 and T7 (refer to FIG. 7) of the first active material sheet 20 and the second active material sheet 30 pressurized by the roll press method that is first performed.

As described above, the first active material sheet 20 and the second active material sheet 30 are simultaneously pressurized and bonded to the through type aluminum sheet 10 by repeating the roll press method twice or more. Accordingly, external appearances of the plurality of first hollow protrusion members 11 and the plurality of second hollow protrusion members 12 can be prevented from being changed or damage to the through holes 11a and 12a, such as that the through holes 11a and 12a are clogged, can be prevented due to applied pressure for bonding the first active material sheet 20 and the second active material sheet 30 together, and an equivalent series resistance characteristic can be prevented from being deteriorated, thereby being capable of implementing an electrode with a high voltage.

Figure 7:
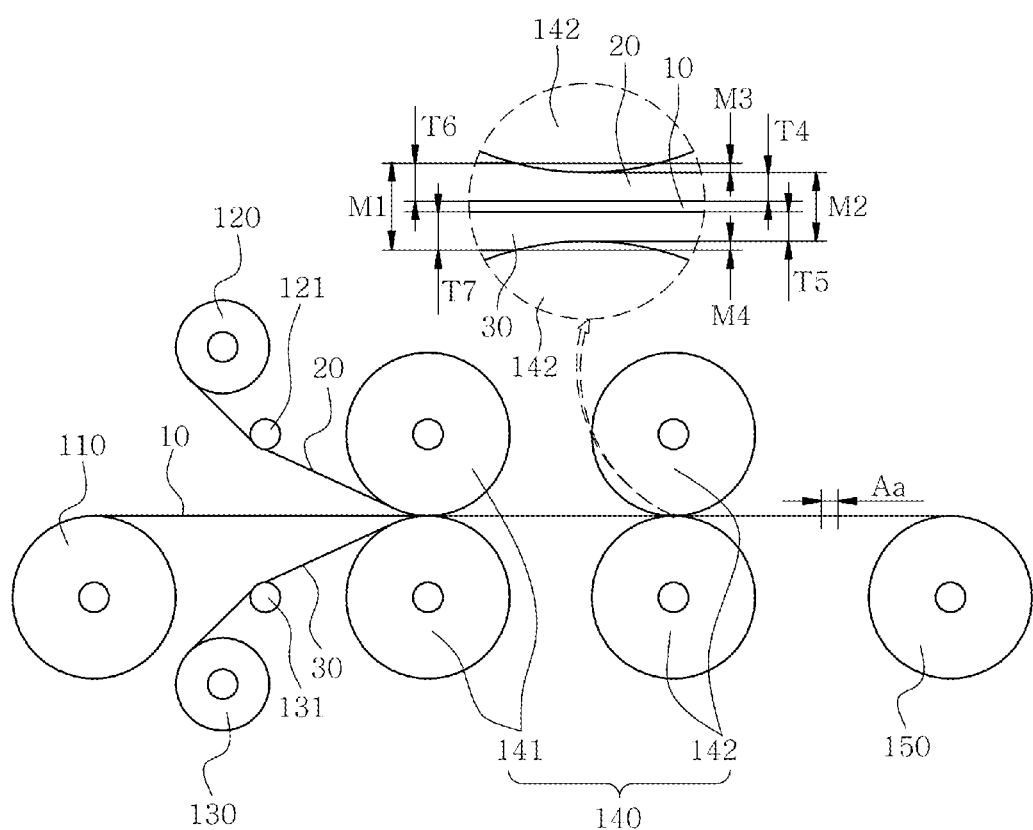
FIG. 7 is a diagram schematically illustrating the configuration of an apparatus for manufacturing the high voltage electrode, which may be applied to an electric double layer capacitor in accordance with an embodiment of the present invention.

For example, the high voltage electrode for an electric double layer capacitor in accordance with an embodiment of the present invention may be formed by repeating a roll press method twice or more using a press unit 140 illustrated in FIG. 7.

In the roll press method that is first performed, the first active material sheet 20 and the second active material sheet 30 are bonded to the metal oxidation layer 13 so that they are respectively placed on the first surface 10a and second surface 10b of the through type aluminum sheet 10 by applying pressure lower than that used in the roll press method that is finally performed. That is, since the first active material sheet 20 and the second active material sheet 30 are bonded to the through type aluminum sheet 10 with low pressure, a change in external appearances of the plurality of first hollow protrusion members 11 and the plurality of second hollow protrusion members 12 attributable to the pressure can be prevented. As described above, in the roll press method that is first performed, the first active material sheet 20 and the second active material sheet 30 are partially filled in the first hollow protrusion members 11 or the second hollow protrusion members 12. As a result, a change in external appearances of the first hollow protrusion members 11 or the second hollow protrusion members 12, which may occur because pressure higher than the pressure used in the roll press method that is first performed is applied to the first hollow protrusion members 11 or the second hollow protrusion members 12, can be prevented.

If the roll press method that is second performed is a roll press method that is finally performed, in the roll press method that is finally performed, the first active material sheet 20 and the second active material sheet 30 are bonded to the metal oxidation layer 13 so that they are respectively placed on the first surface 10a and second surface 10b of the through type aluminum sheet 10 by applying pressure higher than that used in the roll press method that is first performed. In the roll press method that is finally performed, although pressure higher than that used in the roll press method that is first performed is applied, external appearances of the first hollow protrusion members 11 or the second hollow protrusion members 12 can be prevented from being changed because the first active material sheet 20 and the second active material sheet 30 have been partially filled in the first hollow protrusion members 11 or the second hollow protrusion members 12 to some extent. In the roll press method that is finally performed, the first active material sheet 20 and the second active material sheet 30 are simultaneously pressurized by applying pressure higher than that used in the roll press method that is first performed. Accordingly, the first active material sheet 20 and the second active material sheet 30 are filled in the plurality of through holes 11a and 12a in the state in which they have been filled in the plurality of first hollow protrusion members 11 and the plurality of second hollow protrusion members 12 and are thus connected.

By the roll press method that is finally performed, the first active material sheet 20 and the second active material sheet 30 are filled in the plurality of through holes 11a and 12a in the state in which they have been filled in the plurality of first hollow protrusion members 11 and the plurality of second hollow protrusion members 12 and bonded to the inner circumference surfaces or outer circumference surfaces of the plurality of first hollow protrusion members 11 and the plurality of second hollow protrusion members 12. Accordingly, the deterioration of an equivalent series resistance characteristic can be prevented because a contact area between the through type aluminum sheet 10 and the first active material sheet 20 and the second active material sheet 30 is increased. The first active material sheet 20 and the second active material sheet 30 are made of the same active materials and are formed by pressurization so that they have the thicknesses T4 and T5 reduced by 2 to 30% compared to the thicknesses T6 and T7. Accordingly, a high voltage electrode having an improved series resistance characteristic can be fabricated because a contact area is increased, and each of the thicknesses T4 and T5 may be 100 to 500 μm. In this case, activated carbon may be used as the active materials, and activated carbon may have an average particle diameter of about 1 to 10 μm and a specific surface area of 1200 to 2200 $m^2/g$.

A method of manufacturing the high voltage electrode for an electric double layer capacitor in accordance with an embodiment of the present invention is described below with reference to the accompanying drawings.

Figures 5, 6:
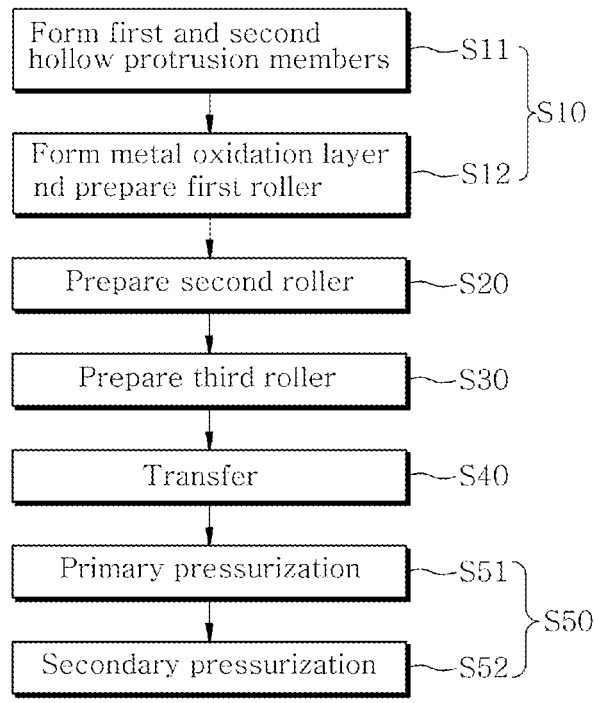
FIG. 5 is a process flowchart illustrating a method of manufacturing the high voltage electrode, which may be applied to an electric double layer capacitor in accordance with an embodiment of the present invention.
FIG. 6 is a table illustrating the characteristics of activated carbon that is used to manufacture a high density electrode, which may be applied to an electric double layer capacitor in accordance with an embodiment of the present invention.

In the method of manufacturing the high voltage electrode for an electric double layer capacitor in accordance with an embodiment of the present invention, as illustrated in FIGS. 5 and 7, first, the through type aluminum sheet 10 in which the plurality of first hollow protrusion members 11 and the plurality of second hollow protrusion members 12 have been respectively formed in the first surface 10a and second surface 10b of the through type aluminum sheet 10 and the metal oxidation layer 13 has been formed on the entire surface of the through type aluminum sheet 10 is prepared by winding the through type aluminum sheet 10 on a first roller 110 at step S10. Furthermore, the first active material sheet 20 is prepared by winding the first active material sheet 20 on a second roller 120 at step S20, and the second active material sheet 30 is prepared by winding the second active material sheet 30 on a third roller 130 at step S30. When the first roller 110, the second roller 120, and the third roller 130 are prepared, the first active material sheet 20 is placed on the first surface 10a of the through type aluminum sheet 10, the second active material sheet 30 is placed on the second surface 10b of the through type aluminum sheet 10, and the through type aluminum sheet 10, the first active material sheet 20, and the second active material sheet 30 are transferred to the press unit 140 at step S40. When the through type aluminum sheet 10, the first active material sheet 20, and the second active material sheet 30 are transferred to the press unit 140, the first active material sheet 20 and the second active material sheet 30 are simultaneously pressurized by the press unit 140 so that they are respectively placed on the first surface 10a and second surface 10b of the through type aluminum sheet 10 and bonded to the metal oxidation layer 13 and they are connected through the plurality of first hollow protrusion members 11 and the plurality of second hollow protrusion members 12 at step S50. Thereafter, the high voltage electrode for an electric double layer capacitor in accordance with an embodiment of the present invention is fabricated using a known dry process.

At step S10 of preparing the through type aluminum sheet 10 by winding it on the first roller 110, first, the plurality of first hollow protrusion members 11 and the plurality of second hollow protrusion members 12 are respectively formed on the first surface 10a and second surface 10b of the through type aluminum sheet 10 at step S11. That is, the plurality of first hollow protrusion members 11 and the plurality of second hollow protrusion members 12 are integrally formed in the through type aluminum sheet 10 so that they are extended from the through type aluminum sheet 10 and protruded in such a way as to communicate with the plurality of through holes 11a and 12a by perforating the through type aluminum sheet 10 using one of the cylindrical pillar member (not illustrated), the elliptical pillar member (not illustrated), and the square pillar member (not illustrated) each having a pointed tip by applying pressure to the first surface 10a or the second surface 10b of the through type aluminum sheet 10 so that the plurality of through holes 11a and 12a is formed in the through type aluminum sheet 10.

The plurality of first hollow protrusion members 11 and the plurality of second hollow protrusion members 12 formed in the through type aluminum sheet 10 are protruded to one side or the other side of the through type aluminum sheet 10, that is, in a first direction or a second direction. The first direction is a direction toward the first surface 10a of the through type aluminum sheet 10. The second direction is opposite the first direction and is a direction toward the second surface 10b of the through type aluminum sheet 10.

When the plurality of first hollow protrusion members 11 and the plurality of second hollow protrusion members 12 are formed, the metal oxidation layer 13 is formed by anodizing the through type aluminum sheet 10 in which the plurality of first hollow protrusion members 11 and the plurality of second hollow protrusion members 12 have been formed. After the metal oxidation layer 13 is formed, the through type aluminum sheet 10 is prepared by winding it on the first roller 110 at step S12. In this case, the metal oxidation layer 13 is formed using an anodization method, and $Al_2O_3$ is used as materials for the metal oxidation layer 13 formed by the anodization method.

At step S20 of preparing the first active material sheet 20 by winding it on the second roller 120 and step S30 of preparing the second active material sheet 30 by winding it on the third roller 130, the first active material sheet 20 and the second active material sheet 30 are made of the same active materials. The active materials may include an electrode substance of 60 to 80 wt % and a viscosity control substance of 20 to 40 wt % and may have viscosity of 5000 to 10000 cps (centi Poise). The first active material sheet 20 and the second active material sheet 30 having some degree of viscosity as described above are transferred and bonded to the through type aluminum sheet 10, thereby being capable of improving adhesive strength between the first active material sheet 20 and the second active material sheet 30. In this case, the electrode substance may include activated carbon of 85 to 95 wt %, a conductive agent of 3 to 8 wt %, and a binder of 2 to 7 wt %. The viscosity control substance may include alcohol of 30 to 60 wt % and pure water of 40 to 70 wt %. Activated carbon is manufactured by performing activation processing on carbon particle powder fabricated using a known aqueous solution method. The activation processing is performed by mixing the carbon particle powder and mixed alkali in a wt % ratio of 1:2 to 3, drying the mixture, and performing annealing on the mixture in a tube furnace under a nitrogen atmosphere in a temperature of 600 to 1000° C. The mixed alkali is mixed so that a wt % ratio of NaOH and KOH is 1:9 to 12.

A method of manufacturing activated carbon is described in detail below. First, carbon particle powder is fabricated using a known aqueous solution method. Known raw materials may be used as the carbon particle powder. Pitch coke, coconut peels, or a bio substance may be used as the raw materials. Potato starch or corn may be used as the bio substance. After the carbon particle powder is fabricated, activation processing is performed on the carbon particle powder. In the activation processing, first, the carbon particle powder is immersed in a mixed alkali solution for 30 minutes to 2 hours, and the carbon particle powder and mixed alkali are mixed by agitating them for 10 to 15 hours.

After the carbon particle powder is mixed with mixed alkali, the mixture is filtered using a known filter and dried in vacuum in a temperature of 100 to 130° C. for 10 to 15 hours. Thereafter, the mixture is activated by performing annealing in a tube furnace under a nitrogen atmosphere in a temperature of 600 to 1000° C. for 30 minutes to 1½ hours. When the activation is completed, the carbon particle powder mixed with mixed alkali is repeatedly washed using distilled water once to 10 times and dried, thereby fabricating activated carbon.

When fabricating activated carbon, mixed alkali including NaOH and KOH forms pores having two types of sizes according to NaOH and KOH in activated carbon. That is, K ions and Na ions form pores of different sizes in activated carbon because they have different sizes and different activation operations. For example, K ions may form pores that are narrower and deeper than pores formed by the activation of Na. Na ions may form pores that are wider and smaller than pores formed by the activation of K ions.

As illustrated in FIG. 6, the specific surface area of activated carbon was increased in experiments in which a wt % ratio of carbide and mixed alkali was changed to 1:2, 1:2.3, 1:2.6, and 1:3 in the state in which a wt % ratio of NaOH and KOH was fixed to 1:9. If a wt % ratio of KOH is increased in mixed alkali as in those experimental embodiments, the specific surface area of activated carbon is increased from 1200 m²/g to 2200 m²/g as illustrated in FIG. 6, thereby enabling activated carbon having an average particle diameter of 1 to 10 μm to be used. That is, the specific surface area of activated carbon is increased although activated carbon has a small average particle diameter. Accordingly, the first active material sheet 20 and the second active material sheet 30 having a low equivalent series resistance characteristic can be fabricated because a contact area between the activated carbon and the metal oxidation layer 13 is increased.

Metal impurities that remain in activated carbon was reduced by changing a wt % ratio of carbide and mixed alkali into 1:3, 1:2.6, 1:2.3, or 1:2 in the state in which the wt % ratio of NaOH and KOH was fixed to 1:9, as illustrated in FIG. 6. For example, there is an advantage in that the metal impurities were improved by the pores formed by Na ions when washing activated carbon, as illustrated in FIG. 6. In this case, the metal impurities that remain after washing activated carbon may include Ni and K.

As described above, the specific surface area is increased, but the metal impurities are reduced depending on a ratio of carbide and mixed alkali. However, if an optimal ratio of carbide and mixed alkali is selected depending on the purpose of use of activated carbon, capacity per volume can be increased and the amount of the metal impurities that remain can be reduced.

At step S50 of simultaneously pressurizing the first active material sheet 20 and the second active material sheet 30 using the press unit 140, as illustrated in FIG. 7, first, when the first active material sheet 20, the second active material sheet 30, and the through type aluminum sheet 10 are transferred to a pair of first press rollers 141, the first active material sheet 20 and the second active material sheet 30 are primarily pressurized using the pair of first press rollers 141 with first pressure at the same time so that the first active material sheet 20 and the second active material sheet 30 are respectively placed on the first surface 10a and second surface 10b of the through type aluminum sheet 10 and bonded by the metal oxidation layer 13 at step S51.

When the through type aluminum sheet 10 onto which the first active material sheet 20 and the second active material sheet 30 have primarily pressurized is transferred to a pair of second press rollers 142, the first active material sheet 20 and the second active material sheet 30 that have been primarily pressurized are secondarily pressurized using the pair of second press rollers 142 with second pressure higher than the first pressure at the same time so that the first active material sheet 20 and the second active material sheet 30 are connected through the plurality of first hollow protrusion members 11 and the plurality of second hollow protrusion members 12 at step S52. In this case, the pressurization is performed so that the thicknesses T4 and T5 of the first active material sheet 20 and the second active material sheet 30 bonded to the first surface 10a and second surface 10b of the through type aluminum sheet 10 by the second pressure are 2 to 30% smaller than the thicknesses T6 and T7 (refer to FIG. 7) of the first active material sheet 20 and the second active material sheet 30 bonded to the first surface 10a and second surface 10b of the through type aluminum sheet 10 by the first pressure.

As illustrated in FIG. 7, the first pressure may be set by an interval M1, that is, a separation distance between the pair of first press rollers 141, and the second pressure may be set by an interval M2, that is, a separation distance between the pair of second press rollers 142. That is, the pair of first press rollers 141 is spaced apart from each other at the interval M1 so that the first pressure is applied to the first active material sheet 20 and the second active material sheet 30, the first active material sheet 20 is formed to a thickness T6, and the second active material sheet 30 is formed to a thickness T7. Furthermore, the pair of second press rollers 142 is spaced apart from each other at the interval M2 so that the second pressure is applied to the first active material sheet 20 and the second active material sheet 30, the first active material sheet 20 is formed to the thickness T4, and the second active material sheet 30 is formed to the thickness T5. Accordingly, the thicknesses T4 and T5 of the first active material sheet 20 and the second active material sheet 30 become 2 to 30% smaller than thicknesses T6 and T7. In this case, the thicknesses T6 and T7 are the same, and the thicknesses T4 and T5 are also the same.

The thicknesses T4 and T5 of the first active material sheet 20 and the second active material sheet 30 that have been secondarily pressurized so that they are reduced by 2 to 30% compared to the thickness T6 and T7 of the first active material sheet 20 and the second active material sheet 30 that have been primarily pressurized are generated due to a difference M3+M4 between the interval M1 between the pair of first press rollers 141 and the interval M2 between the pair of second press rollers 142. That is, the first pressure and the second pressure are set by the interval M1 between the pair of first press rollers 141 of the press unit 140 and the interval M2 between the pair of second press rollers 142 of the press unit 140. A difference between the first pressure and the second pressure is generated due to the difference M3+M4 between the interval M1 between the pair of first press rollers 141 and the interval M2 between the pair of second press rollers 142. For example, if the interval M1 is set to be identical with an interval M2+M3+M4, the thicknesses T4 and T5 of the first active material sheet 20 and the second active material sheet 30 may become 2 to 30% smaller than the thicknesses T6 and T7, thereby easily implementing an electrode with a high voltage. In this case, the intervals M1 and M2 are respectively indicative of the interval between the pair of first press rollers 141 spaced apart from each other or the interval between the pair of second press rollers 142 spaced apart from each other.

Conductive adhesives are used to further improve adhesive strength between the metal oxidation layer 13 and the first active material sheet 20 and the second active material sheet 30. Known materials may be used as the conductive adhesives. The conductive adhesives are coated on the metal oxidation layer 13 in the spray state so that it is placed on the first surface 10a or second surface 10b of the through type aluminum sheet 10. After the conductive adhesives are coated on the metal oxidation layer 13, the first active material sheet 20 and the second active material sheet 30 are simultaneously pressurized by the press unit 140 so that the first active material sheet 20 and the second active material sheet 30 are more firmly bonded to the metal oxidation layer 13 through the conductive adhesives. Accordingly, the high voltage electrode for an electric double layer capacitor in accordance with an embodiment of the present invention is fabricated.

As described above, the high voltage electrode for an electric double layer capacitor and the method of manufacturing the same according to the embodiments of the present invention can implement a high voltage electrode by preventing a loss of the surface area of an aluminum sheet that is used in an electrode for an electric double layer capacitor so that a contact area between the aluminum sheet and the active material sheet is increased when forming the plurality of through holes in the aluminum sheet and by forming the metal oxidation layer on the entire surface of the aluminum sheet.

The high voltage electrode for an electric double layer capacitor and the method of manufacturing the same according to the embodiments of the present invention may be applied to the manufacturing industry field for electric double layer capacitors.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A high voltage electrode for an electric double layer capacitor, comprising:
    a through type aluminum sheet configured to have a plurality of through holes formed in the through type aluminum sheet so that the through holes are spaced apart from one another;
    a plurality of first hollow protrusion members extended from the through type aluminum sheet in such a way as to communicate with the through holes and protruded to a first side of the through type aluminum sheet;
    a plurality of second hollow protrusion members spaced apart from the plurality of first hollow protrusion members, extended from the through type aluminum sheet in such a way as to communicate with the through holes, and protruded to a second side of the through type aluminum sheet;
    a metal oxidation layer coated on the through type aluminum sheet, the plurality of first hollow protrusion members, and the plurality of second hollow protrusion members;
    a first active material sheet placed on a first surface of the through type aluminum sheet and bonded to the metal oxidation layer so that the plurality of first hollow protrusion members is buried; and
    a second active material sheet configured to have the plurality of second hollow protrusion members buried in the second active material sheet and placed on a second surface of the through type aluminum sheet and bonded to the metal oxidation layer so that the second active material sheet is connected to the first active material sheet through the plurality of first hollow protrusion members and the plurality of second hollow protrusion members,
    wherein: each of the plurality of first hollow protrusion members and the plurality of second hollow protrusion members is formed by perforating the through type aluminum sheet by applying pressure on the first side or second side of the through type aluminum sheet using one of a cylindrical pillar member, an elliptical pillar member, and a square pillar member each having a pointed tip so that the plurality of through holes is formed in the through type aluminum sheet,
    the plurality of first hollow protrusion members and the plurality of second hollow protrusion members are extended and protruded from the through type aluminum sheet in such a way as to respectively communicate with the plurality of through holes, and
    each of the through holes has one of a cylindrical shape, an oval, and a square shape by one of the cylindrical pillar member, the elliptical pillar member, and the square pillar member.

2. The high voltage electrode of claim 1, wherein:
    the plurality of through holes spaced apart from one another is formed in the through type aluminum sheet,
    the first surface and second surface of the through type aluminum sheet penetrate the plurality of through holes, and
    each of the plurality of through holes has a diameter of 50 to 100 µm.

3. The high voltage electrode of claim 1, wherein the through type aluminum sheet has a thickness of 10 to 50 µm.

4. The high voltage electrode of claim 1, wherein each of the plurality of first hollow protrusion members and the plurality of second hollow protrusion members comprises one or more extruded burr members formed by one of a cylindrical pillar member, an elliptical pillar member, and a square pillar member each having a pointed tip.

5. The high voltage electrode of claim 4, wherein:
    the one or more extruded burr members are spaced apart from one another and integrally formed in the through type aluminum sheet so that the extruded burr members are extended from the through hole, and
    each of the one or more extruded burr members has a height of 2 to 70 µm.

6. The high voltage electrode of claim 1, wherein:
    the first active material sheet and the second active material sheet are simultaneously pressurized and bonded the metal oxidation layer so that the first active material sheet and the second active material sheet are placed on the first surface and second side of the through type aluminum sheet by repeating a roll press method twice or more so that the first active material sheet and the second active material sheet are connected through the plurality of first hollow protrusion members and the plurality of second hollow protrusion members, and
    if the roll press method is repeatedly performed twice or more, each of a thickness of the first active material sheet and a thickness of the second active material sheet pressurized by a roll press method that is finally performed is 2 to 30% smaller than each of a thickness of the first active material sheet and a thickness of the second active material sheet pressurized by a roll press method that is first performed.

7. The high voltage electrode of claim 1, wherein:
    the first active material sheet and the second active material sheet are made of identical active materials,
    each of the first active material sheet and the second active material sheet has a thickness of 100 to 500 µm,
    the active materials comprise activated carbon, and
    the activated carbon has an average particle diameter of 1 to 10 µm and a specific surface area of 1200 to 2200 m$^2$/g.

8. A method of manufacturing a high voltage electrode for an electric double layer capacitor, the method comprising:
    preparing a through type aluminum sheet configured to have a plurality of first hollow protrusion members and a plurality of second hollow protrusion members respectively formed in a first surface and second surface of the through type aluminum sheet and to have a metal oxidization layer formed on an entire surface of the through type aluminum sheet by winding the through type aluminum sheet on a first roller;

preparing a first active material sheet by winding the first active material sheet on a second roller;
preparing a second active material sheet by winding the second active material sheet on a third roller;
placing the first active material sheet on the first surface of the through type aluminum sheet and the second active material sheet on the second surface of the through type aluminum sheet and transferring the through type aluminum sheet and the first active material sheet and the second active material sheet to a press unit; and
placing the first active material sheet and the second active material sheet in the first surface and second surface of the through type aluminum sheet, respectively, bonding the first active material sheet and the second active material sheet to the metal oxidation layer, and simultaneously pressurizing the first active material sheet and the second active material sheet using the press unit so that the first active material sheet and the second active material sheet are connected through the plurality of first hollow protrusion members and the plurality of second hollow protrusion members,
wherein preparing the through type aluminum sheet by winding the through type aluminum sheet on the first roller comprises:
forming the plurality of first hollow protrusion members and the plurality of second hollow protrusion members in the first surface and second surface of the through type aluminum sheet, respectively; and
forming the metal oxidation layer by anodizing the through type aluminum sheet in which the plurality of first hollow protrusion members and the plurality of second hollow protrusion members have been formed and preparing the through type aluminum sheet by winding the through type aluminum sheet on the first roller after the metal oxidation layer is formed.

9. The method of claim 8, wherein forming the plurality of first hollow protrusion members and the plurality of second hollow protrusion members comprises:
forming a plurality of through holes in the through type aluminum sheet by perforating the through type aluminum sheet by applying pressure in the first surface or the second surface using one of a cylindrical pillar member, an elliptical pillar member, and a square pillar member each having a pointed tip, and
integrally forming the plurality of first hollow protrusion members or the plurality of second hollow protrusion members so that the plurality of first hollow protrusion members or the plurality of second hollow protrusion members are extended and protruded from the through type aluminum sheet in such a way as to respectively communicate with the plurality of through holes.

10. The method of claim 9, wherein each of the plurality of first hollow protrusion members and the plurality of second hollow protrusion members is protruded to a first side or second side of the through type aluminum sheet.

11. The method of claim 8, wherein in preparing the through type aluminum sheet by winding the through type aluminum sheet on the first roller, the metal oxidation layer is formed using an anodization method, and $Al_2O_3$ is used as materials for the metal oxidation layer formed by the anodization method.

12. The method of claim 8, wherein in preparing the first active material sheet and preparing the second active material sheet, the first active material sheet and the second active material sheet are made of identical active materials, and the active materials comprise an electrode substance of 60 to 80 wt % and a viscosity control substance of 20 to 40 wt % and have viscosity of 5000 to 10000 cps (centi Poise).

13. The method of claim 12, wherein:
the electrode substance comprises activated carbon of 85 to 95 wt %, a conductive agent of 3 to 8 wt %, and a binder of 2 to 7 wt %,
the activated carbon is fabricated by performing activation processing on carbon particle powder fabricated using an aqueous solution method,
the activation processing is performed by mixing the carbon particle powder and mixed alkali in a wt % ratio of 1:2 to 3, drying the mixture, and annealing the dried mixture in a tube furnace under a nitrogen atmosphere in a temperature of 600 to 1000° C., and
the mixed alkali is mixed so that a wt % ratio of NaOH and KOH is 1:9 to 12.

14. The method of claim 12, wherein the viscosity control substance comprises alcohol of 30 to 60 wt % and pure water of 40 to 70 wt %.

15. The method of claim 8, wherein simultaneously pressurizing the first active material sheet and the second active material sheet using the press unit comprises:
primarily pressurizing the first active material sheet and the second active material sheet with first pressure using a pair of first press rollers so that the first active material sheet and the second active material sheet are respectively placed in the first surface and second surface of the through type aluminum sheet and bonded to the metal oxidation layer; and
secondarily pressurizing the first active material sheet and the second active material sheet simultaneously with second pressure higher than the first pressure using a pair of second press rollers so that the primarily pressurized first active material sheet and second active material sheet are connected through the plurality of first hollow protrusion members and the plurality of second hollow protrusion members,
wherein the first pressure is set by an interval between the pair of first press rollers, and the second pressure is set by an interval between the pair of second press rollers.

16. The method of claim 15, wherein in secondarily pressurizing the first active material sheet and the second active material sheet, the second pressure is applied so that thicknesses of the first active material sheet and the second active material sheet bonded to the first surface and second surface of the through type aluminum sheet are 2 to 30% smaller than thicknesses of the first active material sheet and the second active material sheet bonded to the first surface and second surface of the through type aluminum sheet by the first pressure.

* * * * *